United States Patent
Tsuchiya et al.

(10) Patent No.: US 9,244,247 B2
(45) Date of Patent: Jan. 26, 2016

(54) AUTO-FOCUS DEVICE, PROJECTION LENS DEVICE, AND IMAGE PROJECTION APPARATUS

(71) Applicants: Satoshi Tsuchiya, Kanagawa (JP); Masamichi Yamada, Kanagawa (JP); Yasunari Mikutsu, Tokyo (JP); Hideo Namba, Kanagawa (JP); Hideo Kanai, Tokyo (JP); Naoyuki Ishikawa, Kanagawa (JP); Motohisa Ikeda, Tokyo (JP)

(72) Inventors: Satoshi Tsuchiya, Kanagawa (JP); Masamichi Yamada, Kanagawa (JP); Yasunari Mikutsu, Tokyo (JP); Hideo Namba, Kanagawa (JP); Hideo Kanai, Tokyo (JP); Naoyuki Ishikawa, Kanagawa (JP); Motohisa Ikeda, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 163 days.

(21) Appl. No.: 14/062,042

(22) Filed: Oct. 24, 2013

(65) Prior Publication Data
US 2014/0132938 A1    May 15, 2014

(30) Foreign Application Priority Data
Nov. 13, 2012    (JP) ................................. 2012-249625

(51) Int. Cl.
*G03B 21/14*    (2006.01)
*G02B 7/09*    (2006.01)
(Continued)

(52) U.S. Cl.
CPC .. *G02B 7/09* (2013.01); *G02B 7/28* (2013.01); *G02B 7/32* (2013.01); *G03B 21/53* (2013.01); *G03B 3/10* (2013.01); *G03B 21/145* (2013.01); *G03B 21/2066* (2013.01); *G03B 33/08* (2013.01)

(58) Field of Classification Search
CPC .... G03B 21/14; G03B 21/145; G03B 21/208; G03B 21/2033
USPC .................... 353/38, 100, 102, 119; 348/345, 348/743–747; 359/529, 557, 676, 684, 695, 359/696, 697, 698, 699, 701, 819, 823; 396/85, 144
See application file for complete search history.

(56) References Cited

U.S. PATENT DOCUMENTS 4,740,676 A    4/1988    Satoh et al.
6,710,806 B1    3/2004    Satoh
(Continued)

FOREIGN PATENT DOCUMENTS

CN    1601372 A    3/2005
CN    200956064 Y    10/2007
(Continued)

OTHER PUBLICATIONS

Combined Chinese Office Action and Search Report issued Apr. 23, 2015 in Patent Application No. 201310560150.3 (with English language translation).

*Primary Examiner* — Sultan Chowdhury
(74) *Attorney, Agent, or Firm* — Oblon, McClelland, Maier & Neustadt, L.L.P.

(57) ABSTRACT

An auto-focus device includes: a light projection lens unit that projects light emitted from a light source unit, on a projection target surface; a light receiving unit that receives a diffusely-reflected light from the projection target surface; a light receiving lens unit that guides the diffusely-reflected light to the light receiving unit; a calculating unit that calculates a focal distance to the projection target surface from the diffusely-reflected light; a first holding unit that holds the light source unit, the light projection lens unit, and the light receiving lens unit; a second holding unit that holds the light receiving unit, and is mounted on the first holding unit; and a pressing unit that presses the second holding unit against the first holding unit. The second holding unit is configured to be displaceable on a surface of the first holding unit along a groove portion formed thereon.

8 Claims, 8 Drawing Sheets

(51) Int. Cl.
*G02B 7/32* (2006.01)
*G03B 21/53* (2006.01)
*G02B 7/28* (2006.01)
*G03B 3/10* (2006.01)
*G03B 21/20* (2006.01)
*G03B 33/08* (2006.01)

(56) References Cited

U.S. PATENT DOCUMENTS

| | | | |
|---|---|---|---|
| 6,844,562 B2 | 1/2005 | Takaoka et al. | |
| 7,054,073 B2* | 5/2006 | Shirie | 359/699 |
| 2005/0099609 A1 | 5/2005 | Masuzawa et al. | |
| 2006/0038967 A1* | 2/2006 | Kitabayashi | 353/119 |
| 2006/0170877 A1* | 8/2006 | Kamiya | G03B 21/14 353/69 |
| 2009/0135258 A1* | 5/2009 | Nozaki | G03B 21/14 348/207.99 |
| 2010/0220293 A1 | 9/2010 | Mizushima et al. | |
| 2012/0008109 A1 | 1/2012 | Hsiung | |
| 2013/0114053 A1* | 5/2013 | Tatsuno et al. | 353/99 |

FOREIGN PATENT DOCUMENTS

| | | |
|---|---|---|
| JP | 59-162408 | 9/1984 |
| JP | 63-88513 A | 4/1988 |
| JP | 5-53176 A | 3/1993 |
| JP | 8-110221 A | 4/1996 |
| JP | 10-325982 | 12/1998 |
| JP | 2000-180701 A | 6/2000 |
| JP | 2001-061155 | 3/2001 |
| JP | 2005-070412 | 3/2005 |
| JP | 2005-283952 | 10/2005 |
| JP | 2006-030533 | 2/2006 |
| WO | WO 2009/034694 A1 | 3/2009 |

* cited by examiner

AUTO-FOCUS DEVICE, PROJECTION LENS DEVICE, AND IMAGE PROJECTION APPARATUS

CROSS-REFERENCE TO RELATED APPLICATIONS

The present application claims priority to and incorporates by reference the entire contents of Japanese Patent Application No. 2012-249625 filed in Japan on Nov. 13, 2012.

BACKGROUND OF THE INVENTION

1. Field of the Invention

The present invention relates to an auto-focus device, a projection lens device, and an image projection apparatus.

2. Description of the Related Art

Conventionally, there is known an image projection apparatus that generates an image to be projected at an image forming unit by using a light emitted from a light source on the basis of image data received from a personal computer or a video camera, etc. and projects the generated image on a projection target surface, such as a screen, to display the image on the projection target surface. Such an image projection apparatus is required to be capable of projecting an image on a large screen and reducing a distance between the image projection apparatus and the projection target surface as much as possible, and image projection apparatuses enabling a short projection distance have been developed.

For example, an image projection apparatus disclosed in Japanese Patent Application Laid-open No. H10-325982 is equipped with an auto-focus device that automatically adjusts the focus of a projected image. The auto-focus device is equipped with a light source for measurement of a distance to a projection target surface separately from a light source device for projecting an image. A light emitted from the light source is reflected by the projection target surface, and a diffusely-reflected light reflected from the projection target surface is received by a light receiving element installed in the auto-focus device. The auto-focus device automatically changes the focus position of a projection lens by calculating a focal distance to the projection target surface from the received diffusely-reflected light.

In the auto-focus device as described above, an amount of received diffusely-reflected light varies depending on the position of the light receiving element installed in the auto-focus device; therefore, accuracy in the installation of the light receiving element is required. However, in the conventional installation of the light receiving element, the light receiving element is directly bonded to a housing of the auto-focus device, which results in inefficient workability and causes a decrease in work efficiency and reduction in the accuracy.

In view of the above, there is a need to provide an auto-focus device that allows accurate installation of a light receiving element.

SUMMARY OF THE INVENTION

It is an object of the present invention to at least partially solve the problems in the conventional technology.

An auto-focus device includes: a light source unit that emits light; a light projection lens unit that projects the light emitted from the light source unit, on a projection target surface; a light receiving unit that receives a diffusely-reflected light from the projection target surface; a light receiving lens unit that guides the diffusely-reflected light to the light receiving unit; a calculating unit that calculates a focal distance to the projection target surface from the diffusely-reflected light received by the light receiving unit; a first holding unit that holds the light source unit, the light projection lens unit, and the light receiving lens unit; a second holding unit that holds the light receiving unit, and is mounted on the first holding unit; and a pressing unit that presses the second holding unit against the first holding unit. The second holding unit is configured to be displaceable on a surface of the first holding unit along a groove portion formed on the first holding unit.

A projection lens device includes an auto-focus device. The auto-focus device includes: a light source unit that emits light; a light projection lens unit that projects the light emitted from the light source unit, on a projection target surface; a light receiving unit that receives a diffusely-reflected light from the projection target surface; a light receiving lens unit that guides the diffusely-reflected light to the light receiving unit; a calculating unit that calculates a focal distance to the projection target surface from the diffusely-reflected light received by the light receiving unit; a first holding unit that holds the light source unit, the light projection lens unit, and the light receiving lens unit; a second holding unit that holds the light receiving unit, and is mounted on the first holding unit; a pressing unit that elastically presses the second holding unit against the first holding unit; a focal-point changing mechanism that changes a focal point of a projection lens; and a motor unit that drives the focal-point changing mechanism on the basis of the calculated focal distance. The second holding unit is configured to be displaceable on a surface of the first holding unit along a groove portion formed on the first holding unit.

An image projection apparatus includes a projection lens device, a light source device, and an auto-focus device. The auto-focus device includes: a light source unit that emits light; a light projection lens unit that projects the light emitted from the light source unit, on a projection target surface; a light receiving unit that receives a diffusely-reflected light from the projection target surface; a light receiving lens unit that guides the diffusely-reflected light to the light receiving unit; a calculating unit that calculates a focal distance to the projection target surface from the diffusely-reflected light received by the light receiving unit; a first holding unit that holds the light source unit, the light projection lens unit, and the light receiving lens unit; a second holding unit that holds the light receiving unit, and is mounted on the first holding unit; a pressing unit that elastically presses the second holding unit against the first holding unit; a focal-point changing mechanism that changes a focal point of a projection lens; and a motor unit that drives the focal-point changing mechanism on the basis of the calculated focal distance. The second holding unit is configured to be displaceable on a surface of the first holding unit along a groove portion formed on the first holding unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
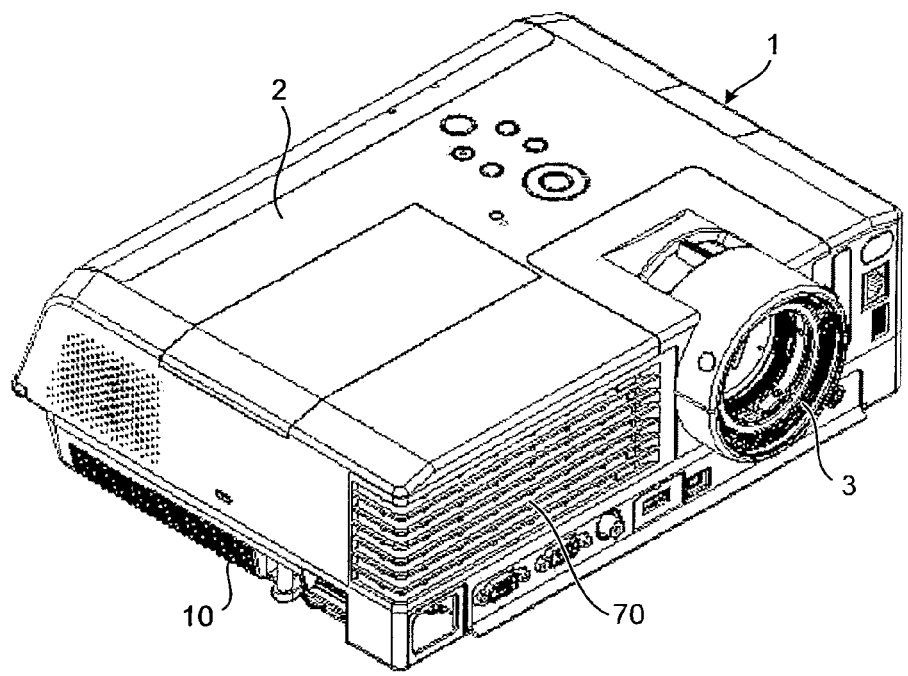
FIG. 1 is a perspective view of a projector according to an embodiment.
Figure 2:
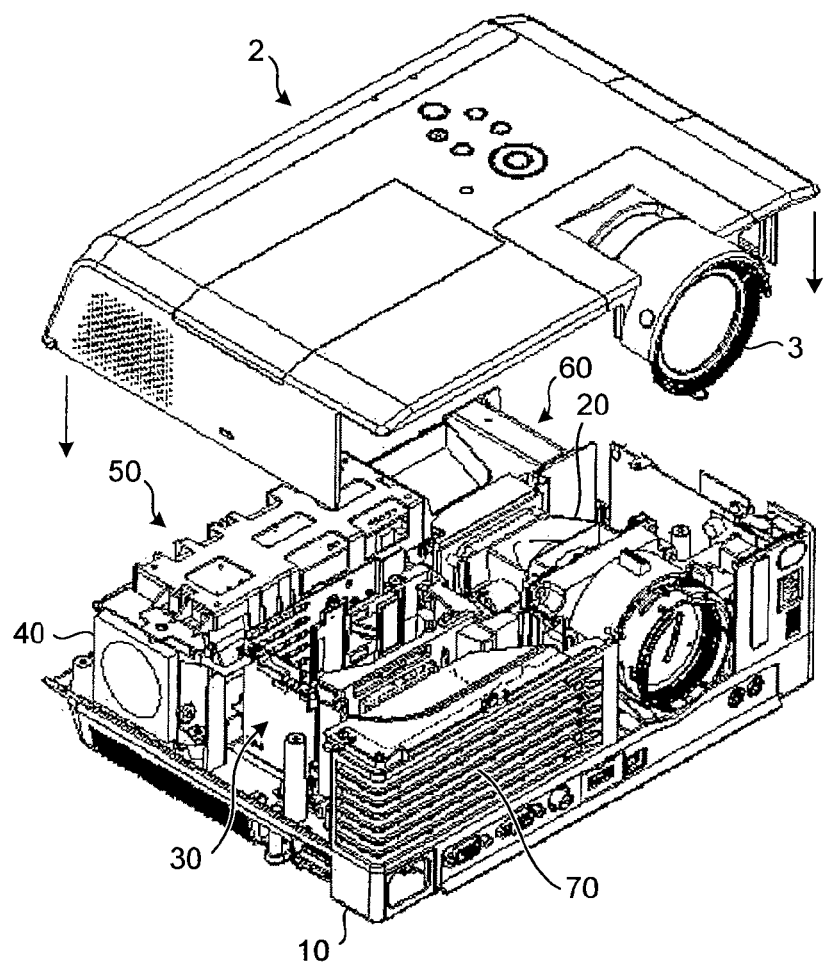
FIG. 2 is a perspective view of the projector with an upper cover off.

An embodiment of an image projection apparatus equipped with an auto-focus device according to the present invention will be explained below with reference to accompanying drawings. FIG. 1 is a perspective view of a projector 1. FIG. 2 is a perspective view of the projector 1 with an upper cover 2 off.

As shown in FIGS. 1 and 2, a projection lens 3 is attached to the upper cover 2. The projection lens 3 can change a magnification ratio of video or image data to be eventually projected on a projection target surface. Furthermore, an optical device 20, a light source device 30, a speaker unit 40, a housing unit 50, an air intake unit 60, and an air exhaust unit 70 are installed in a main body part 10 composing a housing of the projector 1.

Figure 3:
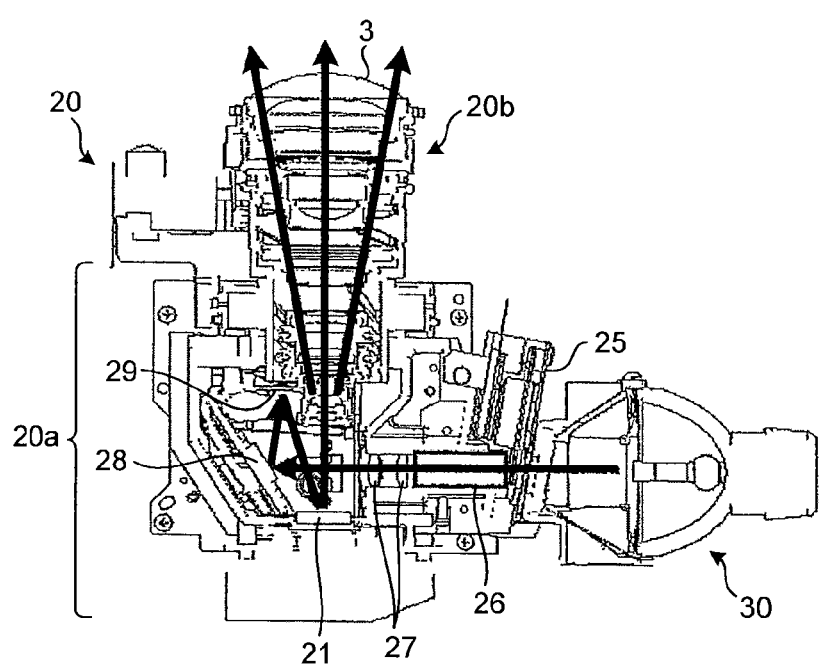
FIG. 3 is a cross-sectional view of an optical device and a light source device according to the embodiment.

FIG. 3 is a cross-sectional view illustrating detailed configurations of the optical device 20 and the light source device 30. As shown in FIG. 3, the optical device 20 includes an illumination optical system 20a and a projection system 20b. The optical device 20 further includes a color wheel 25, a light tunnel 26, a relay lens 27, a flat mirror 28, and a concave mirror 29. These components are installed in a main body part of the optical device 20. Furthermore, an image forming unit 21 is installed in the optical device 20. The image forming unit 21 is composed of a DMD element which is an image forming element for forming an image.

The disc-shaped color wheel 25 converts white light emitted from the light source device 30 into light of RGB colors in rotation at intervals of a unit time, and outputs the converted light toward the light tunnel 26. The light tunnel 26 is formed into a cylindrical shape by bonding sheet glass, and guides the light exiting from the color wheel 25 to the relay lens 27. The relay lens 27 is composed of a combination of two lenses, and condenses the light exiting from the light tunnel 26 while correcting axial chromatic aberration. The flat mirror 28 and the concave mirror 29 reflect the light exiting from the relay lens 27 to guide the light to the image forming unit 21 so that the light is focused on the image forming unit 21. The image forming unit 21 includes the DMD element; the DMD element has a rectangular mirror surface composed of multiple micromirrors, and processes and reflects a projecting light so as to form predetermined image data by driving the micromirrors in a time-division manner on the basis of video or image data.

The light source device 30 includes, for example, a high-pressure mercury lamp as a light source. The light source device 30 emits a white light toward the illumination optical system 20a of the optical device 20. In the illumination optical system 20a, the white light emitted from the light source device 30 is separated into RGB and is guided to the image forming unit 21. The image forming unit 21 forms an image according to a modulation signal. The projection system 20b enlarges and projects the formed image.

Above the image forming unit 21 in the vertical direction, i.e., in front of the image forming unit 21 in FIG. 3, an OFF light plate for receiving an unnecessary light which is not used as a projecting light out of a light incident on the image forming unit 21 is installed. When light enters the image forming unit 21, the multiple micromirrors operate in a time-division manner on the basis of video data by the action of the DMD element, and light to be used is reflected to the projection lens 3 and light not to be used is reflected to the OFF light plate by the micromirrors. In the image forming unit 21, the light used for a projecting image is reflected to the projection system 20b, and is enlarged through multiple projection lenses 3, and the enlarged video light is projected in an enlarged manner.

Figure 4:
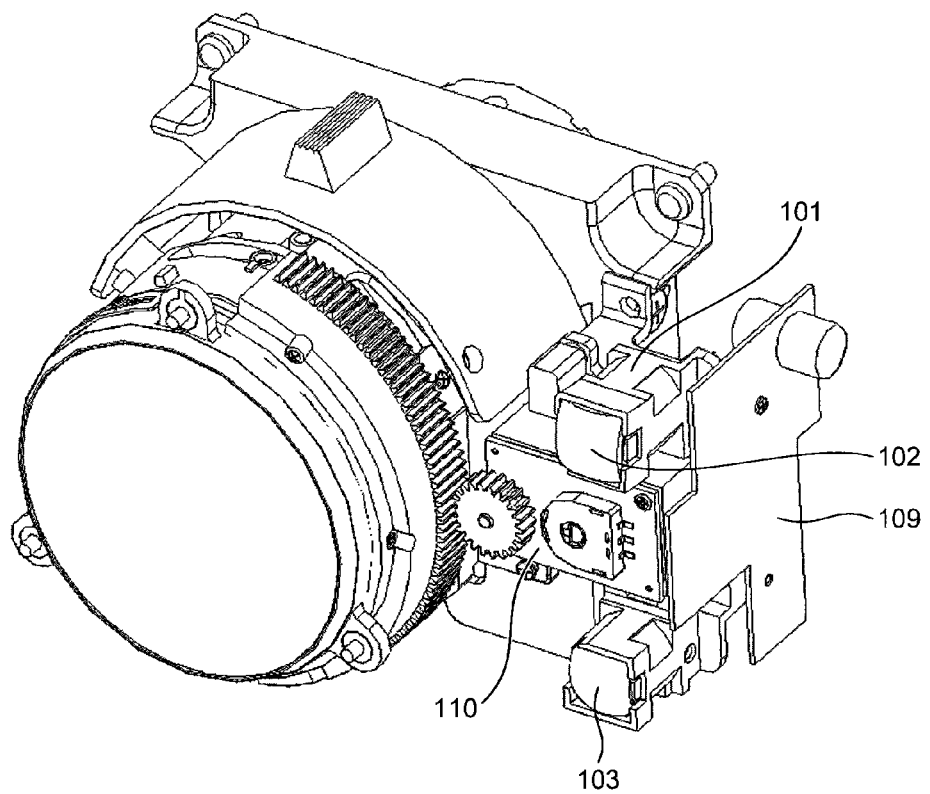
FIG. 4 is a perspective view showing a configuration of an auto-focus device according to the embodiment.
Figure 5:
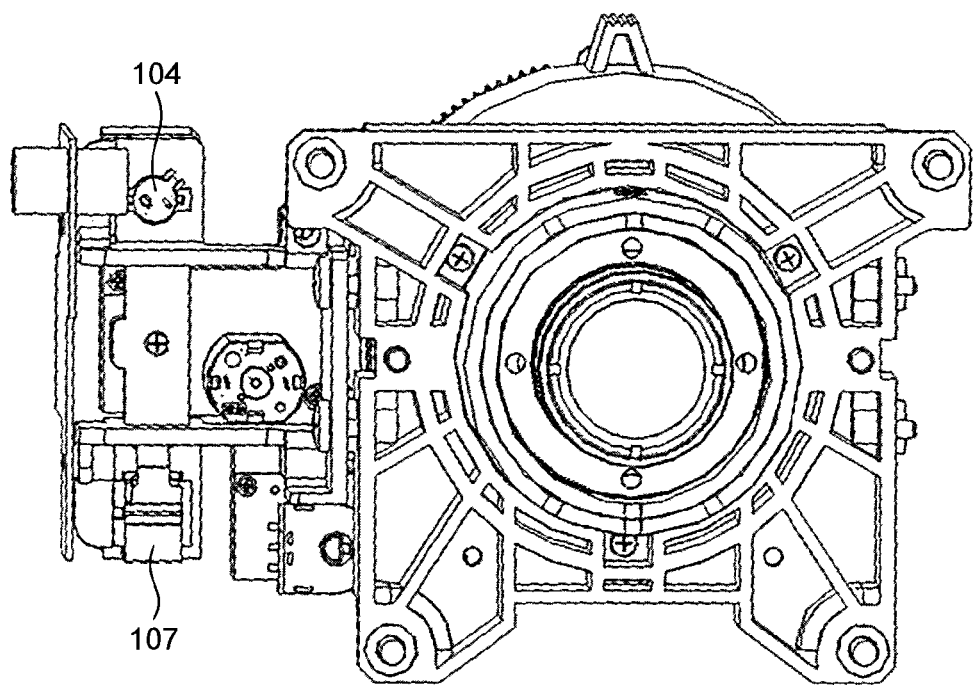
FIG. 5 is a back view showing the configuration of the auto-focus device according to the embodiment.

The projection lens 3 according to the present embodiment is equipped with an auto-focus device 101. A detailed configuration of the auto-focus device 101 is explained with reference to FIGS. 4 and 5. FIG. 4 is a diagram of the auto-focus device 101 viewed from the front, and FIG. 5 is a diagram of the auto-focus device 101 viewed from the back. The auto-focus device 101 is placed on the opposite side of the light source device 30 across the projection lens 3. Therefore, the effect of heat from the light source device 30 can be reduced, and the stable and highly precise auto-focusing can be executed. As shown in FIGS. 4 and 5, the auto-focus device 101 includes a light projection lens 102, a light receiving lens 103, a measurement light source 104, a light receiving unit 105, a control unit 109, and a motor unit 110. The motor unit 110 drives a focal-point changing mechanism of the projection lens 3. The measurement light source 104 corresponds to a light source unit that emits a light for measurement of a distance to a screen which is a projection target surface. The light projection lens 102 projects a beam of light emitted from the measurement light source 104 on the screen. The light receiving lens 103 receives a diffusely-reflected light reflected from the screen, and guides a necessary amount of light to the light receiving unit 105. The control unit 109 (a calculating unit) calculates a distance to the screen and a focal distance of the projection lens 3 with respect to the screen on the basis of an amount of luminous flux obtained by the light receiving unit 105, and gives an instruction on a movement amount to the motor unit 110 that drives the lens. The control unit 109 is equipped with a circuit for distance calculation on a substrate thereof.

The flow of a process relating to the lens drive is explained below. The control unit 109 performs, for example, triangulation-based focusing calculation on the basis of an electrical signal output from the light receiving unit 105, and calculates the optimum focus position of the projection lens 3. Specifically, the control unit 109 detects a light receiving position by finding a peak position in light intensity distribution of a received-light pattern from the electrical signal output from the light receiving unit 105, and acquires basic data for calculation of a distance to the screen according to how far the light receiving position deviates from a reference position. Then, the control unit 109 determines a projection distance to the screen by using the triangulation method from the acquired data, and calculates the optimum focus lens position by using the projection distance.

The control unit 109 controls the motor unit 110 so that the calculated focus position of the projection lens 3 is reached.

The above-described control is performed by actually projecting an image, for example, at the time of initialization of the projector 1 or the like, and it can be visually confirmed that the focus lens moves and the image becomes focused.

Figure 6:
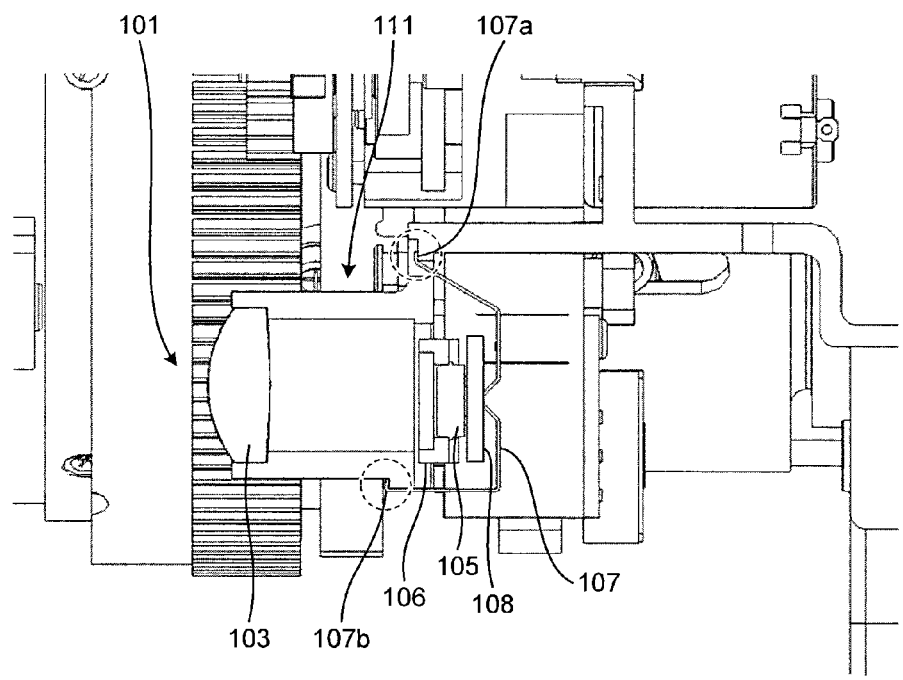
FIG. 6 is a side view showing the configuration of the auto-focus device according to the embodiment.
Figure 7:
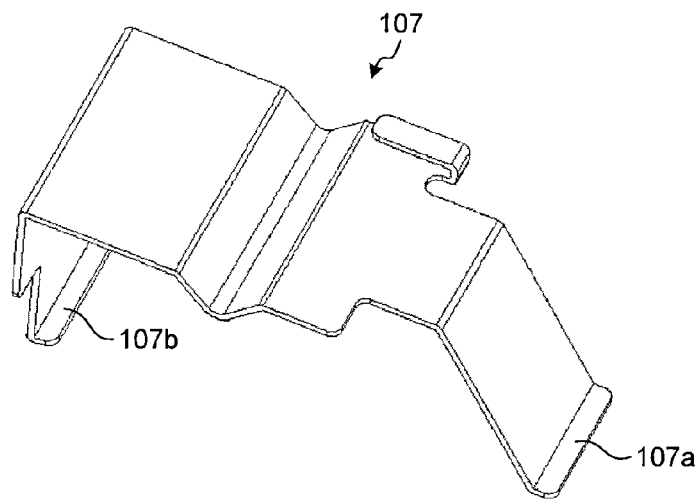
FIG. 7 is a perspective view showing a configuration of a pressing unit used in the auto-focus device according to the embodiment.

Subsequently, the placement of the light receiving unit 105 is explained with reference to FIGS. 6 and 7. FIG. 6 is a diagram of the auto-focus device 101 viewed from the side, and FIG. 7 is a diagram of the auto-focus device 101 viewed from the back. As shown in FIG. 6, the light receiving unit 105 is held by a light-receiving-unit holding unit 106 (a second holding unit). Furthermore, the light projection lens 102, the light receiving lens 103, the measurement light source 104, the light receiving unit 105, the control unit 109, the motor unit 110, and the light-receiving-unit holding unit 106 which holds the light receiving unit 105 are held by a holding unit 111 (a first holding unit) which is a housing of the auto-focus device 101. A diffusely-reflected light passing through the light receiving lens 103 reaches the light receiving unit 105 through a hole (not shown) formed on the light-receiving-unit holding unit 106. Incidentally, after the light receiving unit 105 is attached to the light-receiving-unit holding unit 106, the light receiving unit 105 is bonded to the light-receiving-unit holding unit 106 with an adhesive agent or the like.

The light-receiving-unit holding unit 106 is held by the holding unit 111 in such a manner that the light-receiving-unit holding unit 106 mounted on the holding unit 111 and a flexible substrate 108 provided for connection with a control board are pressed against the holding unit 111 by a pressing unit 107 so as to come into contact with the light receiving unit 105. FIG. 7 is a diagram showing a configuration of the pressing unit 107. As shown in FIG. 7, the pressing unit 107 has a support portion 107a and a hooking portion 107b, and is made of elastic material. Furthermore, in the present embodiment, the pressing unit 107 is composed of shielding material that blocks or inhibits the transmission of an electrical noise component to the light receiving unit 105. As shown in FIG. 6, the support portion 107a of the pressing unit 107 is inserted into a cutout formed on the holding unit 111, and the hooking portion 107b is hooked on a locking portion formed on the holding unit 111, so that the light-receiving-unit holding unit 106 is pressed against the holding unit 111 by the elasticity of the pressing unit 107.

Figure 8:
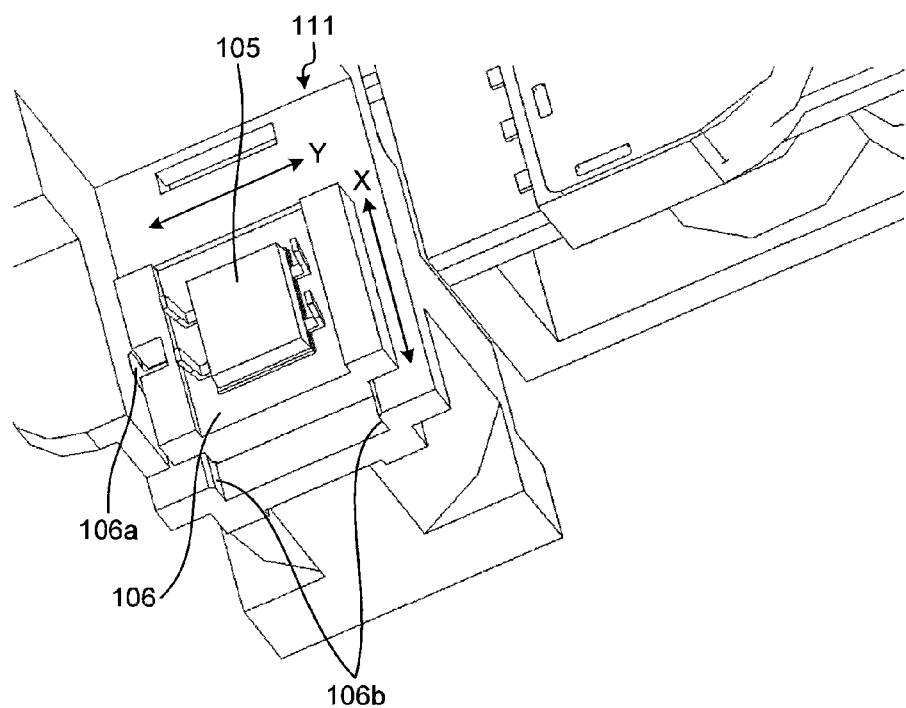
FIG. 8 is a perspective view showing a state where the pressing unit is removed from the auto-focus device according to the embodiment.
Figure 9:
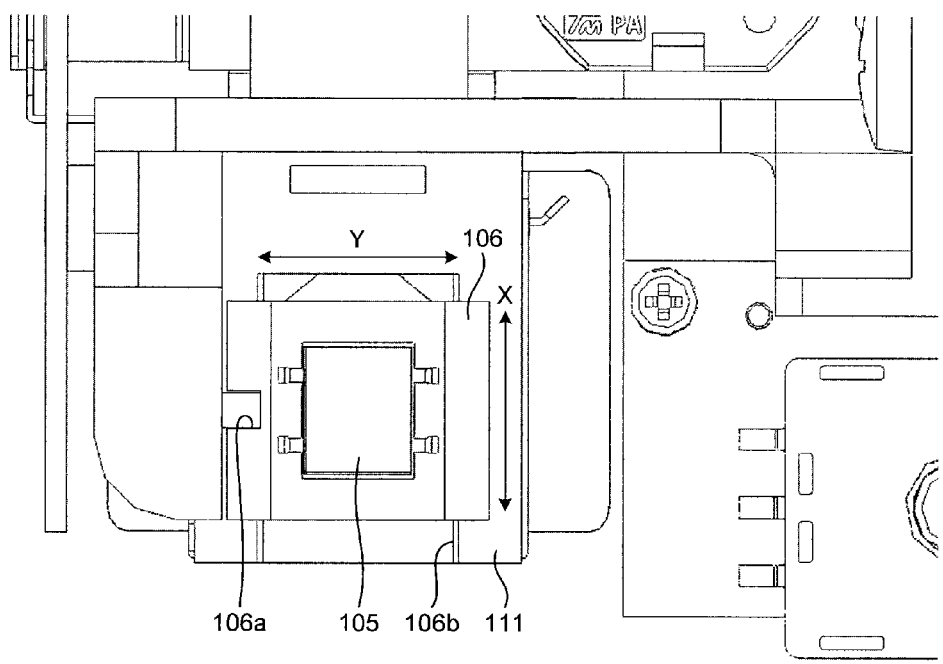
FIG. 9 is a back view showing the state where the pressing unit is removed from the auto-focus device according to the embodiment.

FIGS. 8 and 9 are diagrams showing a state where the light-receiving-unit holding unit 106 is mounted on the holding unit 111, and the pressing unit 107 is removed. As shown in FIG. 8, the light-receiving-unit holding unit 106 is attached to a sliding portion 106b (a groove portion) formed on the holding unit 111. The sliding portion 106b is formed on a surface on which the light-receiving-unit holding unit 106 is mounted so that the width of the sliding portion 106b is the same as the length of the light-receiving-unit holding unit 106 in a direction of an arrow Y, and the light-receiving-unit holding unit 106 can be displaced by being slid along the sliding portion 106b in a direction of an arrow X.

To ensure the precision of the focus, the light receiving unit 105 needs to obtain a sufficient amount of light from a beam that the light receiving lens 103 guides. Therefore, the light receiving unit 105 is installed so as to be located in a plane parallel to the screen and on a straight line connecting the optical axes of the light projection lens 102 and the light receiving lens 103, with respect to the light receiving lens 103. Therefore, the sliding portion 106b is formed so as to be located on the straight line connecting the optical axes of the light projection lens 102 and the light receiving lens 103.

Furthermore, the light-receiving-unit holding unit 106 is provided with an operated part 106a. The operated part 106a is a part that can be operated from the outside with the pressing unit 107 attached to the auto-focus device 101, and is formed at such a position that the light-receiving-unit holding unit 106 can be easily slid by inserting, for example, a thin stick or the like. Then, after the position of the light-receiving-unit holding unit 106 is adjusted in this way, the light-receiving-unit holding unit 106 is fixed to the holding unit 111 at the position where appropriate output from the light receiving unit 105 can be obtained.

Incidentally, the control unit 109 can be provided with a temperature sensor for measuring the ambient temperature so that the focus position of the projection lens 3 can be corrected according to a temperature measured by the temperature sensor.

In the above-described auto-focus device 101 according to the present embodiment, after the light receiving unit 105 is held by the light-receiving-unit holding unit 106, the position adjustment can be performed by sliding the light-receiving-unit holding unit 106 on the holding unit 111. Therefore, the position at which the light receiving unit 105 can properly receive a diffusely-reflected light can be easily determined, and the high accuracy can be achieved through the position adjustment.

Furthermore, the light receiving unit 105 and the flexible substrate 108 are pressed against the holding unit 111 by the pressing unit 107 made of shielding material, thereby making it possible to inhibit the transmission of electrical noise to the light receiving unit 105, and the output accuracy of the light receiving unit 105 can be improved without increasing the number of parts. Moreover, the pressing unit 107 itself is hooked on the holding unit 111 without using any screws or the like, and is fixed to the holding unit 111 by its own elasticity; therefore, it is possible to prevent an increase in the number of parts.

According to the embodiment, it is possible to achieve an effect of improving accuracy in the installation of the light receiving element with a simple configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An auto-focus device comprising:
   a light source unit that emits light;
   a light projection lens that projects the light emitted from the light source unit;
   a light receiving unit that receives a light emitted from the light source unit;
   a light receiving lens that guides the light emitted from the light source unit;
   a first holding unit that holds the light receiving lens;
   a second holding unit that holds the light receiving unit, and is mounted on the first holding unit; and
   a pressing unit that presses the second holding unit against the first holding unit, wherein
   the second holding unit is configured to be displaceable on a surface of the first holding unit along a groove portion formed on the first holding unit.

2. The auto-focus device according to claim 1, wherein
   the pressing unit is composed of material that inhibits transmission of an electrical noise component to the light receiving unit.

3. The auto-focus device according to claim 1, wherein
   the second holding unit has an operated part that can be operated from the outside of the device in a state in which the pressing unit is attached to the auto-focus device, when the second holding unit is displaced.

4. The auto-focus device according to claim 1, wherein the pressing unit includes a support portion and a hooking portion, and the pressing unit is connected to the first holding unit by the support portion and the hooking portion and presses the second holding unit against the first holding unit by an elasticity of the pressing unit.

5. A projection lens device comprising:
an auto-focus device, wherein
the auto-focus device includes:
   a light source unit that emits light;
   a light projection lens that projects the light emitted from the light source unit;
   a light receiving unit that receives a light emitted from the light source unit;
   a light receiving lens that guides the light emitted from the light source unit;
   a first holding unit that holds the light receiving lens;
   a second holding unit that holds the light receiving unit, and is mounted on the first holding unit;
   a pressing unit that elastically presses the second holding unit against the first holding unit, and
the second holding unit is configured to be displaceable on a surface of the first holding unit along a groove portion formed on the first holding unit.

6. The projection lens device according to claim 5, wherein the pressing unit includes a support portion and a hooking portion, and the pressing unit is connected to the first holding unit by the support portion and the hooking portion and presses the second holding unit against the first holding unit by an elasticity of the pressing unit.

7. An image projection apparatus comprising:
a projection lens device;
a light source device; and
an auto-focus device, wherein
the auto-focus device includes:
   a light source unit that emits light;
   a light projection lens unit that projects the light emitted from the light source unit;
   a light receiving unit that receives a light emitted from the light source unit;
   a light receiving lens that guides the light emitted from the light source unit;
   a first holding unit that holds the light receiving lens;
   a second holding unit that holds the light receiving unit, and is mounted on the first holding unit; and
   a pressing unit that elastically presses the second holding unit against the first holding unit, and
the second holding unit is configured to be displaceable on a surface of the first holding unit along a groove portion formed on the first holding unit.

8. The image projection apparatus according to claim 7, wherein
the pressing unit includes a support portion and a hooking portion, and the pressing unit is connected to the first holding unit by the support portion and the hooking portion and presses the second holding unit against the first holding unit by an elasticity of the pressing unit.

* * * * *